United States Patent Office.

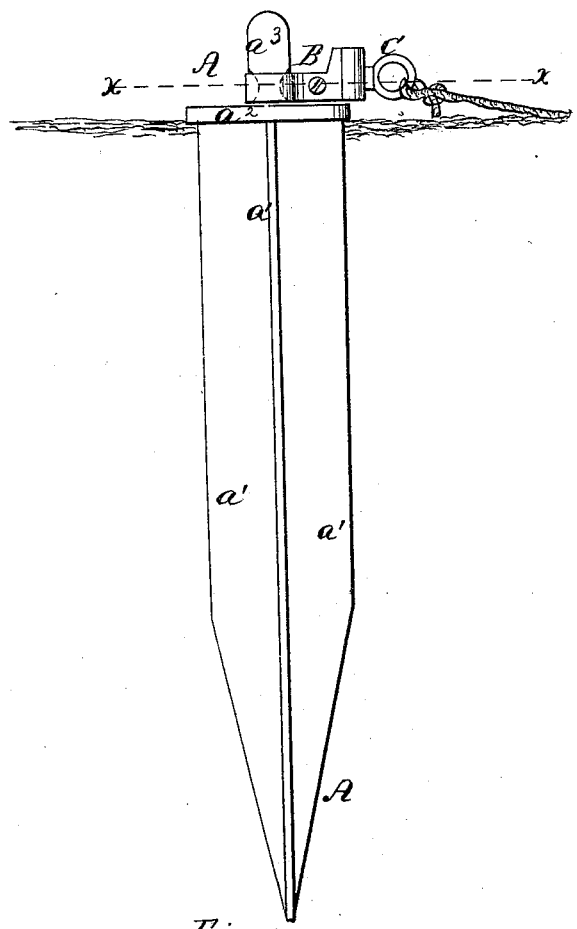

P. H. RAIFORD, OF HOUSTON, TEXAS.

Letters Patent No. 91,042, dated June 8, 1869.

IMPROVED ANCHOR FOR ANIMALS.

The Schedule referred to in these Letters Patent and making part of the same.

*To all whom it may concern:*

Be it known that I, P. H. RAIFORD, of Houston, Harris county, Texas, have invented a new and improved Anchor for Animals; and I do hereby declare that the following is a full, clear, and exact description thereof, which will enable others skilled in the art to make and use the same, reference being had to the accompanying drawings, forming part of this specification, in which—

Figure 1 is a side view of my improved anchor.

Figure 2 is a top view of the same, partly in section, through the line $x\,x$, fig. 1.

Similar letters of reference indicate corresponding parts.

My invention has for its object to furnish an improved device for use in staking out horses and other animals to graze, which shall be so constructed and arranged that it will be impossible for the animal to twist or wind up the rope while grazing; and It consists in the combination of the pivoted and swivelled loops with the pin, as hereinafter more fully described.

A represents the pin, which is made with four wings, or radial longitudinal flanges, tapering to a point at its lower end, so that it may be readily forced into the ground, and easily drawn out, but will resist a very strong side-draught.

For securing gentle animals, the pin A may be made as a simple pin, and without the flanges $a^1$.

Upon the upper end of the pin A, is formed a surface-plate, $a^2$, which rests upon the suface of the ground, and prevents the pin from being driven in too far.

Upon the upper side of the surface-plate $a^2$, is formed a pin, or knob, $a^3$, about the neck of which is placed the loop B, in such a way that it may turn freely about the said pin in a horizontal direction, and, at the same time, cannot be drawn from the said pin, or knob $a^3$. This may be accomplished by making the loop B open, and securing it by a screw when passed around the neck of the said pin, or knob; or the same thing may be accomplished by making the loop close, and of such a size as to slip over the end of the said pin, or knob $a^3$, the said loop B being secured from being drawn off by spring-catches attached to the upper end of said knob or pin.

To the outer end, or stem of the loop B is swivelled the loop C, to which the rope is to be attached.

By this construction, it will be impossible for the animal, when grazing, to wind up the rope by passing around the pin, or to twist the rope by stepping over it.

Having thus described my invention,

What I claim as new, and desire to secure by Letters Patent, is—

1. The combination of the swivelled loop C and pivoted loop B with each other, and with the pin A, or its equivalent, substantially as herein shown and described, and for the purpose set forth.

2. An improved anchor for animals, formed by the combination of the pin A $a^1$ $a^2$ $a^3$, pivoted loop B, and swivelled loop C, with each other, substantially as herein shown and described, and for the purpose set forth.

The above specification of my invention signed by me, this 6th day of January, 1869.

P. H. RAIFORD.

Witnesses:
 J. W. McCONAUGHEY,
 T. McRAE.